United States Patent
Ciluffo

[19]

[11] Patent Number: 6,119,088
[45] Date of Patent: Sep. 12, 2000

[54] APPLIANCE CONTROL PROGRAMMER USING VOICE RECOGNITION

[76] Inventor: Gary Ciluffo, 103 Henderon Hill, Vincennes, Ind. 47594

[21] Appl. No.: 09/034,096

[22] Filed: Mar. 3, 1998

[51] Int. Cl.[7] .................................................. G10L 15/22
[52] U.S. Cl. ........................... 704/275; 704/246; 381/110
[58] Field of Search .................................... 704/275, 246, 704/247, 248, 249, 250; 381/110

[56] References Cited

U.S. PATENT DOCUMENTS

| | | | |
|---|---|---|---|
| 5,040,212 | 8/1991 | Bethards | 381/41 |
| 5,247,580 | 9/1993 | Kimura et al. | 381/43 |
| 5,777,571 | 7/1998 | Chuang | 341/176 |
| 5,878,394 | 3/1999 | Muhling | 704/275 |

*Primary Examiner*—David R. Hudspeth
*Assistant Examiner*—Harold Zintel
*Attorney, Agent, or Firm*—Polster, Lieder, Woodruff & Lucchesi

[57] ABSTRACT

A voice activated programmer (10) controlling the operation of an appliance such as a television (T) or VCR (V). A receiver (12) operating in the audio frequency range receives an audio command spoken by a person. A converter (20) converts the audio input to the receiver into an electrical signal. A processor (22) processes the electrical signal to determine if the person who spoke is a person previously authorized to operate the appliance. A controller (32) performs the function requested by the person who spoke only if the person is a previously authorized person. If more than one person directs a command to the programmer, the sequence with which the commands are executed is determined based on a voice hierarchy.

18 Claims, 2 Drawing Sheets

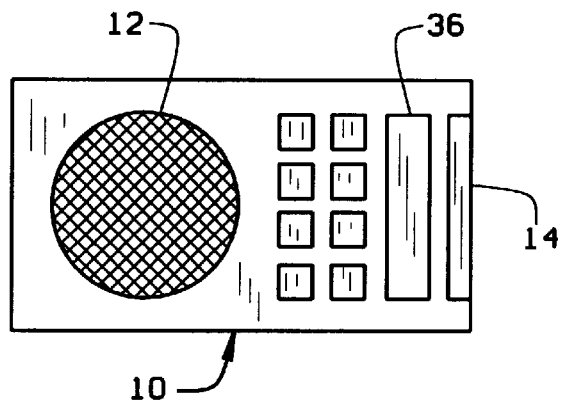
FIG. 1
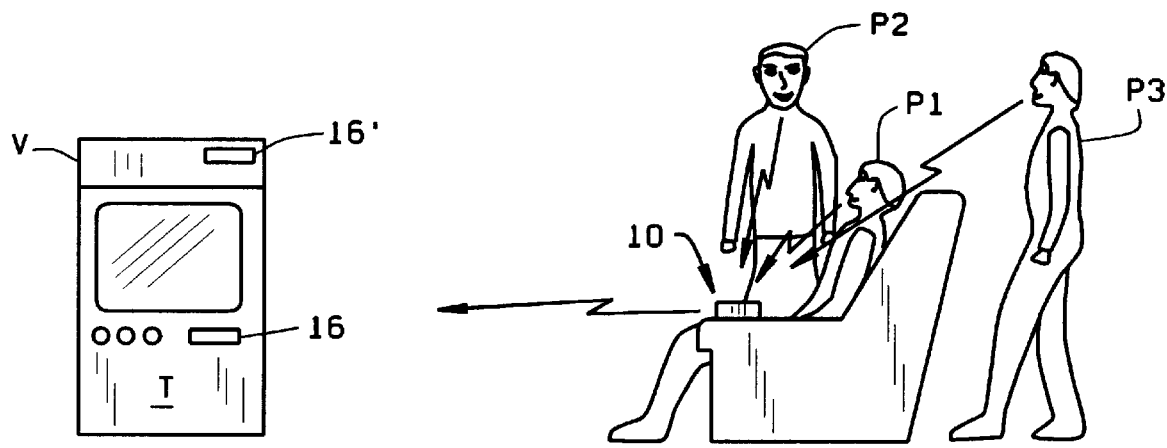
FIG. 2
| | | | |
|---|---|---|---|
| ENTER VOICE 34a | LANGUAGE 34e | VOICE TIMING 34d | MEMORY I/F |
| DELETE VOICE 34b | FEATURE SELECT | APPLIANCE 34g | PROCESSOR I/F |
| LIST HEIRARCHY 34c | FEATURE LOCKOUT 34f | COMMAND TIMING 34h | COMMAND I/F |
FIG. 4

APPLIANCE CONTROL PROGRAMMER USING VOICE RECOGNITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to the control of various appliances such as televisions, VCR's, stereos and the like, and more particularly, to a programmer having a voice recognition capability. The programmer is a universal programmer usable with any appliance. In one embodiment, the programmer is a remote unit. In a second embodiment, the programmer is built into the appliance.

Remote control units by which someone can command operations of an appliance from a distance are well-known in the art. Probably the most well-known type of programmer is the infrared unit used to remotely control televisions and VCR's. By pointing the end of the unit in which the infrared transmitter is housed at a window on the television set or VCR behind which an infrared receiver is located, an infrared signal is transmitted from the programmer to the appliance. This signal is modulated in accordance with the control buttons or switches manipulated by the user to turn the appliance on or off, change channels, raise or lower the volume, record a program, play it back, etc. Use of the programmer requires that the user grasp or hold the unit and point in the direction of the appliance. Oftentimes this requires the user to set aside something (the paper, a book, food or drink) in order to use the programmer. This causes the user unnecessary inconvenience. In addition, programmers are sometimes fitted in a bracket and locked in place so they cannot be misplaced or stolen. This is how programmers placed in hotel or motel rooms are often kept. Again, use of such a programmer is inconvenient unless the user is sitting or lying right next to the piece of furniture where the programmer is located.

Until recently, it had been necessary to have a separate programmer for each appliance which a user operated. That is, the user had one unit to turn the television on, and another to turn on the VCR and play a tape viewed on the television. Now, "universal type" programmers, also using infrared, have been introduced. These new devices are asserted to be able to control a number of separate appliances using only the one unit.

Regardless, it is a drawback of current programmers that whoever has control of the unit has control of the appliance. Thus, a youth with access of a programmer can switch television channels to one which his parents may not want him to watch, play a video which his parents consider inappropriate, turn up the volume to too loud a level, switch a channel being recorded from one which someone else has set to be recorded, and so forth. Or, someone may simply not want someone else, a guest, for example, to be able to control their television or VCR. It is a commonplace experience that when a unit is near someone, they almost always pick it up and use it.

BRIEF SUMMARY OF THE INVENTION

Among the several objects of the present invention may be noted the provision of a programmer for use with televisions, VCR's, stereo systems, and other appliances;

the provision of such a programmer to be a voice activated programmer which responds to verbal commands to transmit an appropriate control signal to the appliance to control operation of the appliance;

the provision of such a programmer to provide all of the command finctions currently available with other programmers such as power on and off, channel control, volume control, programming of which channel will be watched and/or recorded at which times, etc.;

the provision of such a programmer to discriminate spoken words to extract therefrom verbal commands to which it responds, the programmer thereby being capable of use even when commands are spoken amidst other conversation;

the provision of such a programmer which can be programmed to recognize only one voice to which it will respond, thereby enabling a parent, for example, to prevent a child from using the programmer;

the provision of such a programmer which further can be programmed to accept different sets of instructions from different individuals whereby when a parents voice is recognized, all commands which the programmer can provide are available, but when the child's voice is recognized, only certain instructions are made available;

the provision of such a programmer which can be programmed to recognize the voices of a number of persons and to which additional voices to be recognized are added, and from which currently recognized voices can be deleted;

the provision of such a programmer which verbally responds to a recognized voice to provide prompts for instructions and the like;

the provision of such a programmer to be incorporated in an appliance so a separate unit is not required;

the provision of such a programmer which, when incorporated in an appliance, readily interfaces with the control circuitry in the appliance or is readily integrated therewith;

the provision of such a programmer which is readily incorporated in an existed programmer;

the provision of such a programmer which can be programmed to receive inputs in a plurality of spoken languages, and to be capable of responding to one command spoken in one language and to another command spoken in a different language;

the provision of such a programmer to respond only to commands spoken in one language and not in others; and, the provision of such a programmer to be relatively low cost, battery powered, and capable of replacing existing touch control programmers.

In accordance with the invention, generally stated, a voice activated programmer controls the operation of an appliance. A receiver operates in the audio frequency range and receives an audio command spoken by a person. A converter converts the audio input to the receiver into an electrical signal, and a processor processes the electrical signal to determine if the person who spoke is a person previously authorized to operate the appliance. A controller performs the finction requested by the person who spoke, only if the person is previously authorized to control operation of the appliance. Other objects and features will be in part apparent and in part pointed out hereinafter.

BRIEF DESCRIPTION OF THE SEVERAL VIEWS OF THE DRAWINGS

In the drawings,

FIG. 1 is a plan view of a voice activated programmer for remotely controlling the operation of appliances;

FIG. 2 is an illustration of one possible use of the programmer;

FIG. 4 is a simplified block diagram of a controller portion of the programmer.

Corresponding reference characters indicate corresponding parts throughout the drawings.

DETAILED DESCRIPTION OF THE INVENTION

Figure 3:
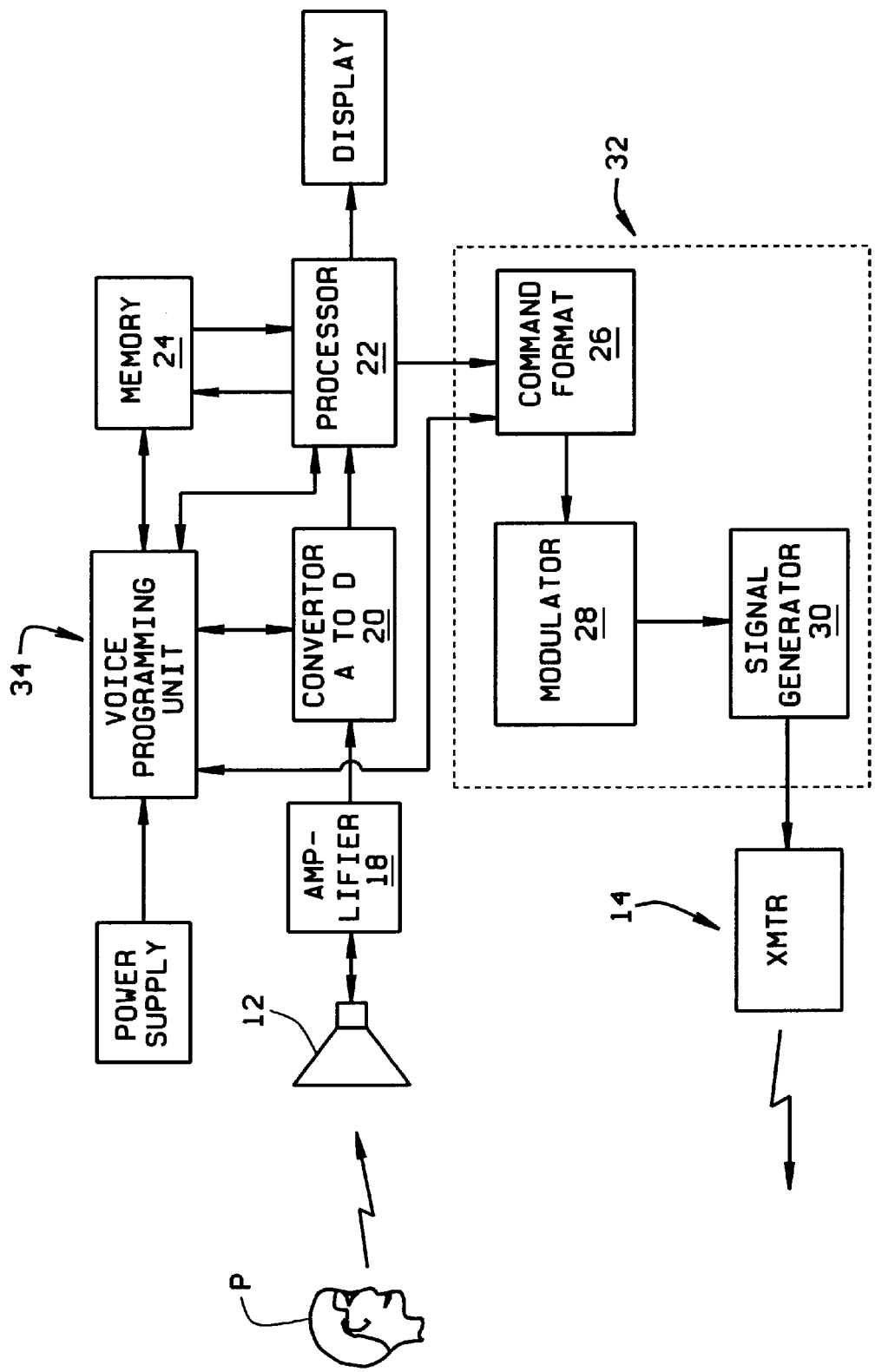
FIG. 3 is a block diagram of the programmer.

Referring to the drawings, a voice activated programmer of the present invention is indicated generally 10 in FIG. 1. Programmer 10 is used to control the operation of an appliance; for example, the television T or VCR V shown in FIG. 2. Although not shown in the drawings, it will be understood that programmer 10 can be used to control other appliances such as stereo equipment, and radios. In the embodiment of the invention shown in FIGS. 1 and 2, programmer 10 is shown as being a unit separate from the appliance. In a separate embodiment of the invention, the programmer can be incorporated in the appliance. In either embodiment, the programmer is responsive to verbal commands spoken by an authorized user of the programmer to execute authorized commands spoken by the user.

The programmer 10 shown in FIG. 1 includes a receiver 12 into or toward which verbal commands are spoken by a person P. Receiver 12 operates in the audio frequency range so to receive commands spoken by the person. An output device 14 transmits a command signal from the programmer to a receiver 16 on the appliance. In response to a received command, the appliance carries out the requested function. Device 14 can be an infrared transmitter of the type commonly found on conventional remote control units, or it can be an rf transmitter. Similarly, receiver 16 can be an infrared or rf receiver, as appropriate. If the programmer is incorporated in the appliance, then the output device, instead of a transmitter, will interface directly with control electronics of the appliance to route a command signal output from the programmer to the electronics.

Referring to FIG. 3, words spoken into receiver 12 comprise an analog input signal which is first amplified by an audio amplifier 18, and then converted from an analog to a digital input signal by an analog-to-digital converter 20. The converted digital command signal is now supplied from converter 20 to a signal processor 22. Processor 22 has an associated memory 24. The processor accesses memory 24, as appropriate, to determine if the speech patterns of the received audio input matches a stored pattern for a person authorized to control the appliance. If a match is found by the processor, the processor now determines what command or function the speaker wishes to have performed. In this regard, the processor determines if the command or function is one which the speaker is permitted to authorize. If so, a command format 26 is accessed by the processor. The output from module 26 controls a signal modulator 28 to appropriately modulate the signal produced by a signal generator 30. The modulated signal is then transmitted by transmitter 14 and is directed at a selected appliance. Command format module 26, modulator 28, and signal generator 30 together comprise a controller 32. The signal generator can comprise a radio frequency signal generator, or an infrared signal generator, and modulator 28 produces an appropriate modulation signal for modulating an rf or infrared signal.

Key to the operation of programmer 10, whether as a separate unit as shown in FIGS. 1 and 2, or as integrated into the appliance, is a voice programming unit, or VPU, 34. The VPU performs a number of functions and operates in conjunction with processor 22, memory 24, and command formatter 26. If it is intended that programmer 10 respond to any voice, the VPU is instructed to accept any voice input. In this mode, operation of the programmer is to determine which command is to be given, and to which appliance, if the programmer is being used with more than one, the command is to be directed.

If, however, it is intended that only certain persons can operate an appliance using the programmer; then, initially, the programmer is selected to operate in an authorization mode. In this mode, VPU 34 is used to authorize voices which can command an appliance. Each authorized person speaks a selected authorization word or phrase into receiver 12. The VPU includes a segment 34a which, in conjunction with processor 22, identifies a speech pattern associated with that individual, and stores this information in memory 24. Thereafter, whenever a person speaks a command, before the programmer will cause the appliance to execute the plan, processor 22 will first search memory 24 to determine if the speech pattern corresponds to a stored pattern. If it does, then the programmer will proceed. If not, the programmer is programmed to respond to the person that the command cannot be carried out because the person is not an authorized user. In addition to authorizing a person, the VPU includes a segment 34b by which a voice pattern stored in memory 24 can be deleted so the person can no longer command the appliance using the programmer.

A number of persons may be authorized to operate appliances using programmer 10. In FIG. 2, three persons P1–P3 are shown, each of whom may be an authorized user. To prevent confusion, a hierarchy of persons can be established within the programmer. Now, using a VPU segment 34c, whenever a new person's speech is to be stored in the programmer, a listing of previously authorized voices is displayed on a visual display 36 of unit 10. Now, the person doing the authorization enters into the hierarchy displayed where the new person shall go. Thereafter, if two or more persons address commands to the unit, hierarchy module 34c determines which voice has priority. In addition, the VPU includes a voice timing module 34d which is used in conjunction with module 34c. The timing module monitors the interval between commands spoken by more than one person, so that if contradictory commands are given by two people within a predetermined time interval, only the priority command will be acted upon and the contradictory command will be locked out. If, however, the time between commands falls outside the interval, then both will be acted upon. The length of the lock out period is selectable by the user.

It is a further feature of the VPU to be programmed to respond to commands for the same appliance spoken in more than language. In many parts of the country it is now commonplace to have household members or employees whose primary language is no the same as that of the household principals. However, both may be commanding the same appliance at different times. A module 34e of the VPU allows persons speaking different languages to command the same appliance. Typically, module 34e will respond to two languages, English and Spanish, for example, but the combinations of languages may vary, and the module can be programmed to respond to three or more languages.

It is also desirable to restrict certain people from issuing certain commands through unit 10 to an appliance. For example, it would not be responsible to allow a child to turn on a stove; or, if it is known that certain programs on television contain subject matter parents deem inappropriate, they can prevent their children from selecting those programs. Accordingly, VPU 34 includes a module 34f which allows the person in charge of unit 10 to program into the memory which commands an authorized user is authorized to command. When a user is being programmed into the unit, display 36 will present a menu of available commands. If the user is allowed to exercise all of the commands, an "ALL" selection is entered into the memory. Otherwise, appropriate entries are made as to which commands the user is authorized to exercise, and the unit can further be programmed to allow certain commands to be exercised at some times, but not at other times. In addition, since unit 10 is usable with more than one appliance, the VPU includes an appliance select module 34g. For each user, the particular appliances which he or she is allowed to operate are selected from this module. For each appliance, the available commands are also listed. In each instance, those commands (other than ALL) which a user can exercise for each appliance are listed so the lockout feature can used with respect to them.

Finally, VPU 34 includes a command timing module 34g. This module, unlike voice timing module 34d, determines whether or not a requested command can be exercised based upon the length of time since the previous command was executed. In some circumstances, it is hamfil to the appliance if one command is executed too soon after the previous command. For example, if one authorized person commands a VCR to REWIND, and someone else immediately thereafter commands it to FAST FORWARD, immediate execution of the second command could cause damage to the unit. Accordingly, module 34g imposes a time period between execution of the first and second commands so the VCR can be stopped, and the tape drive reversed. While this interval may only be one or two seconds, the result is to allow the appliance to operate as is it is designed to do, and to not be overstressed.

It is an important feature of the present invention to be incorporated in an appliance so a separate unit is not required in order to convey commands to the appliance. In this regard, the output of command format module 26 interfaces directly with the control circuitry of the appliance. Or, the circuitry shown in FIG. 3 can be integrated directly with the control circuitry of the appliance.

What has been described is a voice activated programmer for use with televisions, VCR's, stereo systems, and other appliances which responds to verbal commands to transmit appropriate control signals to the appliance. The programmer is a relatively low cost, battery powered unit capable of replacing existing touch control programmers. The programmer provides all of the command functions currently available with touch control type programmers including, for example, which channel of a television will be watched or recorded at particular times. The programmer can discriminate among spoken words and extract verbal commands, even if the commands are spoken amidst other conversation. Each programmer is separately programmable to recognize only one voice to which it will respond, or to respond to a number of voices. If the programmer responds to more than one voice, a hierarchy can be established as to voice has precedent over which other voices. Additionally, the programmer can be programmed to accept only certain instructions from some authorized voices. Voices can be added to, or deleted from, those accepted by the programmer.

The programmer can verbally respond to a recognized voice to provide prompts for instructions and the like, and this is especially helpful when incorporated in an appliance so a separate unit is not required. The programmer can receive inputs in a plurality of spoken languages, and is capable of responding to one command spoken in one language and to another command spoken in a different language. Or, the programmer can respond only to commands spoken in one language and not in others.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A voice activated programmer for controlling the operation of an appliance comprising:

a receiver operating in the audio frequency range to receive commands spoken by a person;

a converter converting commands received by the receiver into an electrical signal;

a processor processing the electrical signal to determine if the person who spoke is a person previously authorized to operate the appliance;

a controller performing the function requested by the person who spoke only if the person is a previously authorized person; and, a voice programmer for initially processing each authorized voice to which said programmer is to respond, the voice programmer including a memory for storing voice indicia by which said authorized voice is to be later recognized, means establishing a hierarchy of voices so if more than one person directs a command at the programmer, the programmer can determine a sequence by which commands will be responded, and appliance selection means for selecting from which of a plurality of appliances with which said programmer may be used, commands spoken by an authorized person are directed.

2. The programmer of claim 1 further inclding a transmitter for transmitting a command signal from said controller to said appliance, said appliance including a receiver for receiving said signal.

3. The programmer of claim 1 wherein said voice programmer further includes command selection means by which specific commands which a person authorized to operate an appliance can use is limited to selected commands.

4. The programmer of claim 3 wherein said voice programmer flrher includes command timing means by which intervals during which the command selection means is engaged is limited to selected time intervals.

5. The programmer of claim 4 wherein said voice programmer further includes voice timing means for determining the length of time between which separate persons have voiced commands for the same appliance and for authorizing execution of the later command only if a predetermined period of time has elapsed since the previous command was spoken.

6. The programmer of claim 5 wherein said voice programmer further includes language means for allowing authorized persons to command an appliance is a plurality of selected languages by which one speaker can issue a command for an appliance in one language, and another authorized person can issue a command for the same appliance in a different language, and said programmer will respond to each command.

7. The programmer of claim 1 wherein said programmer further includes means for deleting authorized voices so a person who is no longer authorized cannot issue commands for an appliance.

8. The programmer of claim 1 wherein said controller includes a command formatter formatting each command to which an appliance is to respond in a format compatible with a receiver of the appliance.

9. The programmer of claim 8 wherein said controller further includes a signal generator producing a command signal directed to said appliance, and a modulator responsive to an input from said command formatter to modulate said command signal.

10. The programmer of claim 9 wherein said signal generator generates a radio frequency signal.

11. The programmer of claim 9 wherein said signal generator generates an infrared signal.

12. A voice activated programmer for controlling the operation of an appliance comprising:

a receiver operating in the audio frequency range to receive a command for said appliance spoken by a person;

a voice programmer for authorizing persons who may use said programmer to command said appliance, said voice programmer initially processing each authorized voice to which said programmer is to respond, said voice programmer including a memory for storing voice indicia by which said authorized voice is to be later recognized, and said voice programmer including means establishing a hierarchy of voices so if more than one person directs a command at the programmer, the programmer can determine a sequence by which commands will be responded;

a processor processing a received command and determining if the person who spoke is a person authorized to operate the appliance; and, means responsive to a verification from said processor that the person is authorized to command the requested function of said appliance.

13. The programmer of claim 12 further including a transmitter for transmitting a command signal from said controller to said appliance, said appliance including a receiver for receiving said signal.

14. The programmer of claim 13 wherein said programmer further includes means deleting authorized voices so a person who is no longer authorized cannot issue commands for an appliance.

15. The programmer of claim 12 wherein said voice programmer further includes appliance selection means for selecting from which of a plurality of appliances with which said programmer may be used, commands spoken by an authorized person can be directed.

16. The programmer of claim 12 wherein said voice programmer further includes language means for allowing authorized persons to command an appliance is a plurality of selected languages by which one speaker can issue a command for an appliance in one language, and another authorized person can issue a command for the same appliance in a different language, and said programmer will respond to each command.

17. A voice activated programmer for controlling the operation of an appliance comprising:

a receiver operating in the audio frequency range to receive a command for said appliance spoken by a person;

a voice programmer for authorizing persons who may use said programmer to command said appliance, said voice programmer including means by which execution of said received commands is limited to selected time intervals;

a processor processing a received command and determining if the person who spoke is a person authorized to operate the appliance;

and, means responsive to a verification from said processor that the person is authorized to command the requested function of said appliance.

18. The voice activated programmer of claim 17 wherein said voice programmer further includes voice timing means for determining the length of time between which separate persons have voiced commands for the same appliance and for authorizing execution of the later command only if a predetermined period of time has elapsed since the previous command was spoken.

* * * * *

UNITED STATES PATENT AND TRADEMARK OFFICE
CERTIFICATE OF CORRECTION

PATENT NO. : 6,119,088
DATED : September 12, 2000
INVENTOR(S) : Gary Ciluffo

It is certified that error appears in the above-identified patent and that said Letters Patent is hereby corrected as shown below:

Col. 4, Line 37
   Delete "confision" and insert --confusion--

Col. 4, Line 57
   Insert --one-- before language

Col. 4, Line 59
   Delete "no" and insert --not--

Col. 6, Line 44
   Delete "inclding" and insert --including--

Col. 6, Line 54
   Delete "flrher" and insert --further--

Signed and Sealed this

Twenty-ninth Day of May, 2001

Attest:

NICHOLAS P. GODICI

*Attesting Officer*    *Acting Director of the United States Patent and Trademark Office*